(12) United States Patent
Kolesnikov (10) Patent No.: US 8,938,414 B1
(45) Date of Patent: Jan. 20, 2015

(54) DATA ABSTRACTION LAYER FOR INTERFACING WITH REPORTING SYSTEMS

(71) Applicant: GoodData Corporation, San Francisco, CA (US)

(72) Inventor: Pavel Kolesnikov, San Francisco, CA (US)

(73) Assignee: GoodData Corporation, San Franscisco, CA (US)

( * ) Notice: Subject to any disclaimer, the term of this patent is extended or adjusted under 35 U.S.C. 154(b) by 0 days.

(21) Appl. No.: 14/297,442

(22) Filed: Jun. 5, 2014

(51) Int. Cl.
*G06F 17/30* (2006.01)

(52) U.S. Cl.
CPC .............................. *G06F 17/30563* (2013.01)
USPC ............ 707/602; 707/607; 707/692; 707/703

(58) Field of Classification Search
CPC ..................... G06F 17/30563; G06F 17/30377
USPC .......... 707/602, 607, 692, 695, 703, 756, 802
See application file for complete search history.

(56) References Cited

U.S. PATENT DOCUMENTS

| | | | |
|---|---|---|---|
| 6,195,662 B1 * | 2/2001 | Ellis et al. | 1/1 |
| 6,993,717 B2 * | 1/2006 | Minninger | 715/255 |
| 7,945,589 B1 * | 5/2011 | Weiss et al. | 707/795 |

* cited by examiner

*Primary Examiner* — Cheryl Lewis
(74) *Attorney, Agent, or Firm* — Fenwick & West LLP (57) ABSTRACT

A data transformation system receives data from one or more external source systems and stores and transforms the data for providing to reporting systems. The data transformation system maintains multiple versions of data received from an external source system. The data transformation system can combine data from different versions of data and provide to the reporting system. As a result, external source systems that do not maintain data in a format appropriate for reporting systems and/or do not maintain sufficient historical data to generate different types of reports are able to generate these reports. The data transformation system can also enhance older versions of data stored in the system or exclude portions of data from reports. The data transformation system can purge older versions of data so that older data that is less frequently requested is maintained at a lower frequency than recent data.

20 Claims, 5 Drawing Sheets

FIG. 2

Full Load 310

| ID | Name | Region | Salary |
|---|---|---|---|
| 1 | John | South | 1100 |
| 2 | Mary | East | 1500 |
| 3 | Todd | West | 1200 |

Updated/New Columns 320

| ID | Salary |
|---|---|
| 1 | 1100 |
| 2 | 1500 |
| 3 | 1200 |

Deleted Record Log 340

| ID |
|---|
| 1 |
| 2 |

Updated/New Rows 330

| ID | Name | Region | Salary |
|---|---|---|---|
| 1 | John | North | 1000 |
| 4 | Katie | West | 2500 |

Current and Historic Versions 300

| ID | Name | Region | Salary |
|---|---|---|---|
| 1 | John | North | 1000 |
| 2 | Mary | East | 1500 |
| 3 | Todd | West | 1200 |

DATA ABSTRACTION LAYER FOR INTERFACING WITH REPORTING SYSTEMS

FIELD OF INVENTION

This invention relates generally to interfacing between production systems and reporting systems in general, and more specifically to a data abstraction layer for interfacing with reporting systems.

BACKGROUND

Businesses store information describing various entities associated with the business and actions related to these entities, for example, various products and services, inventory of the business, transactions, employee information, and so on. Personnel associated with a business often like to view reports representing the business data. For example, a sales executive could like to view reports describing sales information for different products for different regions. A human resources person could like to see reports describing employee information, payroll information, and so on.

Various vendors provide reporting systems for generating reports based on the business data. Reporting systems often require data to be represented in a particular format for purposes of generating reports. However, businesses represent and store information to support their business processes and transactions. The representation of information available from a business may not be suitable for purposes of reporting. Furthermore, a business may not store all the information needed for purposes of reporting. For example, a reporting system may need historical information for generating reports, for example, quarterly or annual reports. However, a business information system may only be able to provide the current information available in the system and not historical information.

As a result, business systems may have to be modified to be able to support reporting systems. This requires businesses to use experts to process their information and enhance their systems to be able to utilize reporting system capabilities. As a result, businesses end up spending significant time, money, and resources in processing their information for purposes of reporting.

SUMMARY

A data transformation system receives data from one or more external source systems and transforms the data for providing to reporting systems. The data transformation system maintains versions of data received from an external source system. Each version of data is associated with a time interval during which the external source system processed the data. The data transformation system loads each version of data from the external source system and stores the loaded data as well as metadata describing the loaded data. The data transformation system receives a request to provide the data obtained from an external source system to a reporting system. The data transformation system identifies the versions of data that include the requested data, transforms the requested data to a format of the reporting system, and sends the data to the reporting system.

The data loaded from the external source system can be in the form of row based changes, column based changes, full snapshots, or information identifying deleted rows. The data provided to the reporting system can be in the form of full snapshots, aggregation of data, change logs, or change logs for a particular column. The data transformation system performs the appropriate transformations from the format in which the external source system provides data to the format in which the reporting system requests data.

The data transformation system stores multiple versions of data corresponding to different time intervals. This allows the data transformation system to modify or enhance an older version of data, for example, if a previous load was deficient for certain reason. Furthermore, the data transformation system can also exclude portions of data from a particular load of data from reports, for example, if the data is determined to be corrupted. In some embodiments, the data transformation system purges older versions of data such that versions of recent data are available at a higher frequency compared to older data.

The features and advantages described in this summary and the following detailed description are not exhaustive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
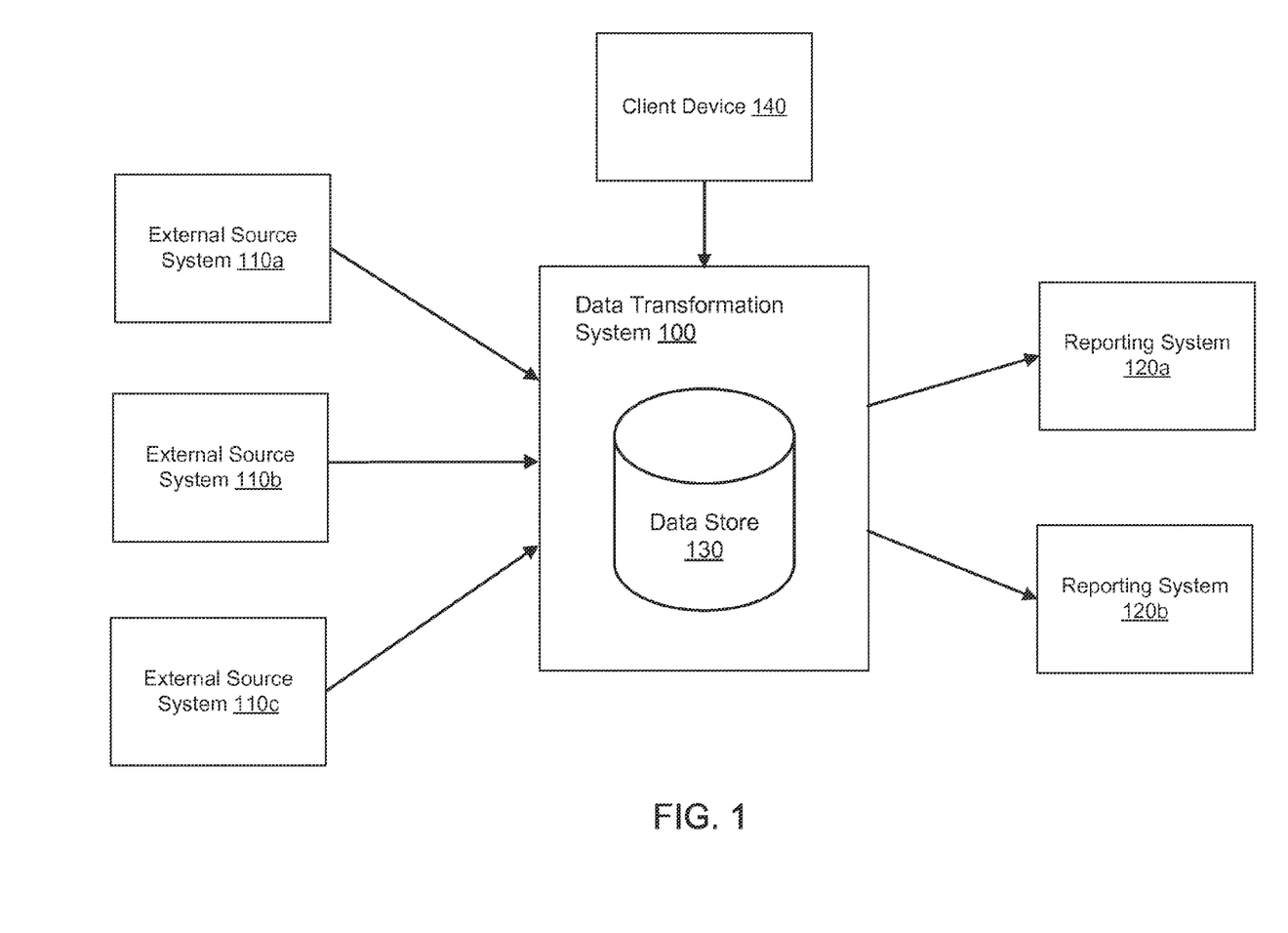
FIG. 1 illustrates an overall system environment for transforming business information to a form suitable for reporting systems, according to an embodiment.

FIG. 1 illustrates an overall system environment for transforming business information to a form suitable for reporting systems, according to an embodiment. The system environment includes one or more external source systems 110, a data transformation system 100, one or more client devices 140, and one or more reporting systems 120. The data transformation system 100 receives data from one or more external source systems 110 and stores the information. The data transformation system 100 provides data to the reporting system 120 for purposes of generating reports. The data transformation information 100 stores the information for a time period that is long enough that the data can be used for generating reports. For example, if a report is requested that aggregates data over a period of a year, the data transformation information 100 stores versions of data for at least a year. The client device 140 is used by users, for example, system administrators to interact with the data transformation system 100. The system environment may include other systems or components not shown in FIG. 1, for example, one or more client devices 140 that interact with the external source systems 110 or with the reporting systems 120.

FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*" and/or "110*b*" in the figures).

An external source system 110 is a system that acts as the source of data for the reporting system 120. For example, an external source system 110 can be a business system that generates data representing various transactions processed by the business. The data generated by an external source system 110 has various attributes, also referred to as dimensions. As an example, the dimensions of the sales data may include the geographical regions associated with particular sales, the products associated with particular sales, time of sales, sales personnel associated with the sales, and so on.

The reporting system 120 is system that generates reports. The reporting system 120 generates various types of reports for a business that allow business personnel to analyze business information. For example, the reporting system 120 may generate reports analyzing the sales of the business for review by sales executives. The reporting system 120 generates reports that analyze the business information along various dimensions. For example, the reporting system 120 may generate reports that provide sales for various geographical regions, sales for various time periods, sales for various products, sales by various teams of sales personnel and so on.

The data generated by the external source system 110 may be available in a format different from the format in which a reporting system 120 receives data for generating reports. The format of the data refers to the structure and type of information available from a source. Examples of formats of data include a full snapshot of data available from a system, changes in information available from a system compared to a previous snapshot, changes in a subset of the data of the system, and so on. As an example, for certain reports, the reporting system 120 may require a complete snapshot of the data for a particular time whereas external source system 110 may provide change logs representing transactions performed since a previous snapshot. Furthermore, the external source system 110 may not store all the information required by a reporting system 120 for generating reports. For example, the reporting system 120 may require historical information for generating reports whereas the external source system 110 may store only the latest information available in the system.

Furthermore, the structure of the data of the external source system 110 may change over time. For example, the external source system 110 may add certain dimensions, delete certain dimensions, and modify certain dimensions over time. The reporting system 120 may receive a request to generate a report based on a set of dimensions for a particular time interval that may not be consistent with the set of dimensions of the data generated by the external source system 110 over the time interval.

The data transformation system 100 receives data from one or more external source system 110 and stores and transforms the data appropriately for providing to a reporting system 120. The data transformation system 100 stores the data received from various external source systems 110 in data store 130. The data transformation system 100 also maintains metadata information describing the data received from various external source systems 110. The data transformation system 100 receives from a reporting system 120, requests for data obtained from an external source system 110 so that the reporting system 120 can generate reports for the external source system 110. The data transformation system 100 provides the requested data conforming to the format requested by the reporting system 120. The data transformation system 100 may receive information describing the format of data supported by a reporting system 120 from a client device 140.

The data transformation system 100 stores information necessary for providing the requested information for a reporting system 120. For example, an external source system 110 may only provide the latest information at any point in time. The data transformation system 100 receives data from the external source system 110 at different points in time and stores the versions of data. The data retrieved is associated with the time interval during which the data was valid in the external source system. Each version of data received from the source system is associated with a timestamp indicating when the data was received by the data transformation system 100. These time intervals may be user configurable. This allows the data transformation system 100 to provide historical data to the reporting system 120 if required for purposes of generating certain reports.

The data transformation system 100 transforms the data to an appropriate format requested by a reporting system 120. For example, the data transformation system 100 may receive a request from a reporting system 120 to provide changes in information during a particular time interval. The data transformation system 100 analyzes the various snapshots of the data received from the external source system 110 to determine the changes as requested by the reporting system 120. The data transformation system 100 further formats the data to conform to the request from the reporting system 120 and sends the data to the reporting system 120.

The data transformation system 100 transforms the data received from an external source system 110 to a format that conforms to a format suitable for consumption by a reporting system 120 from data provided by an external source system 110 in a format that may not be suitable for consumption by a reporting system 120. For example, the data transformation system 100 may receive changed logs from an external source system 110 and transform the data to generate a full snapshot for purposes of generating reports for a reporting system 120. Similarly, the data transformation system 100 may receive full snapshots and may transform the data to represent changes in data over a time period for purposes of generating reports for a reporting system 120.

Client device 140 can be a conventional computer system (e.g., a desktop or laptop computer), a tablet, or a device having computer functionality such as a personal digital assistant (PDA), a mobile telephone, a smartphone or another suitable device. The various systems shown in FIG. 1 are configured to communicate via a network, which may comprise any combination of local area and/or wide area networks, using both wired and/or wireless communication systems. In one embodiment, the network uses standard communications technologies and/or protocols. Data exchanged over the network may be represented using any suitable format, such as hypertext markup language (HTML) or extensible markup language (XML). In some embodiments, all or some of the communication links of the network may be encrypted using any suitable technique or techniques.

System Architecture

Figure 2:
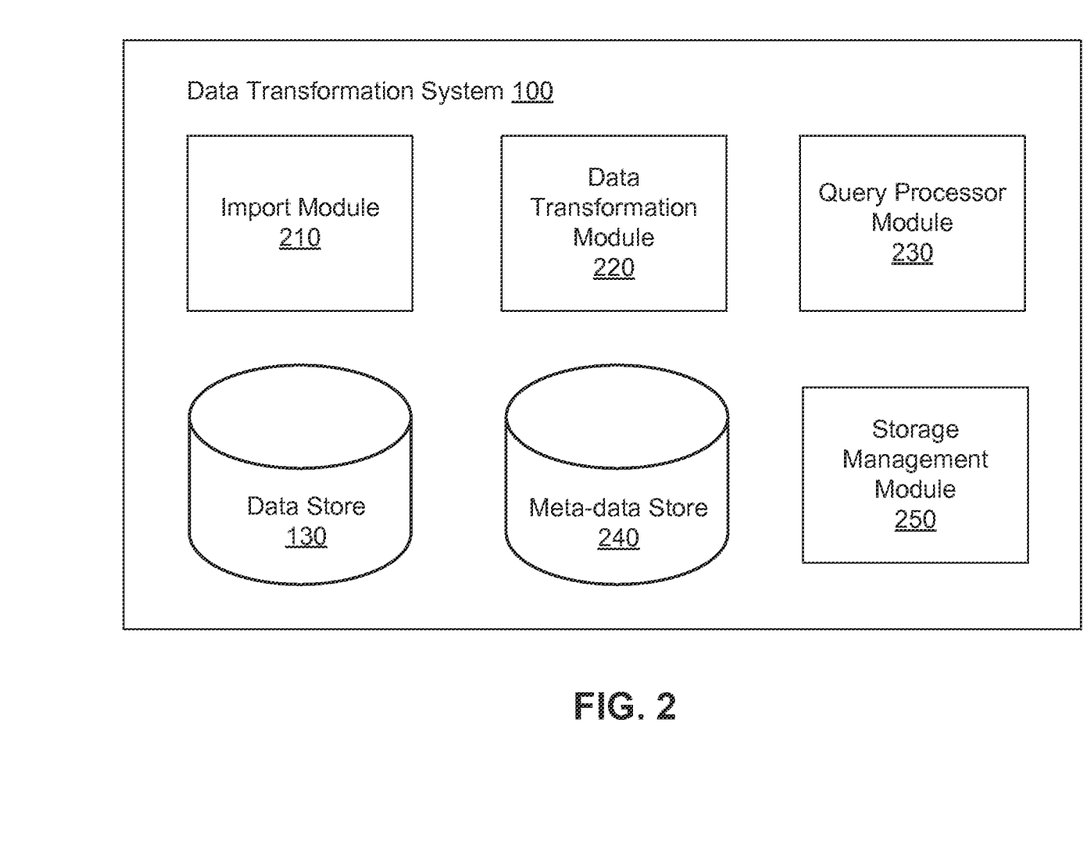
FIG. 2 illustrates the system architecture of the data transformation system, according to an embodiment.

FIG. 2 illustrates the architecture of the data transformation system, according to an embodiment. The data transformation system 100 includes an import module 210, a data transformation module 220, a data store 130, a meta-data store 240, a storage management module 250, and a query processor module 230. In other embodiments, the data transformation system 100 may include other components or modules not shown in FIG. 2. Furthermore, functionality described herein may be implemented by different modules than those indicated herein.

The import module 210 imports data from the external source systems 110 and stores the imported data in the data store 130. The import module 210 repeatedly loads data from each external source system 110 at various intervals of time. The schedule for retrieving data from the external source systems 110 may be user specified. For example, the data transformation system 100 may receive the schedule for obtaining data from an external source system 110 from a system administrator via the client device 140.

The data store 130 stores the data imported by the import module 210 from one or more external source systems 110. The data store 130 stores multiple versions of the data imported from each external source system 110. Each version of data is associated with a time interval. For example, for a particular external source system 110, the import module 210 may load data once a day and the data store 130 stores a version of the data for each day.

The data store 130 may store the loaded data in relational database format. In some embodiments, the data store 130 stores the data as a columnar database. Storing the data as a columnar database allows the data store 130 to provide data suitable for processing by reporting systems 120. The data received from an external source system 110 can be in a format different from the format in which the data is stored in the data store 130.

The data transformation module 220 transforms the data received in a source format from an external source system 110 to a format in which the data transformation system 100 stores the data in the data store 130. For example, the data transformation module 220 may receive data in the format of changed logs and convert the data to columnar format for storing in the data store 130. The data transformation module 220 identifies the new sets of values for each column based on the changed logs and stores the new values for each column in the columnar format. In other embodiments, the data store 130 stores the data for each version in a row-oriented format. The data transformation module 220 may receive change logs from the external source system 110 and generate a new version of data by applying the change logs to a previous version of data. The data transformation module 220 stores the new version of data in row-oriented format in data store 130.

The meta-data store 240 stores metadata describing the data obtained from the external source systems 110 and stored in the data store 130. The meta-data store 240 stores information describing the source of the data (i.e., information identifying the external source system 110 that provided the data), the time at which each load of data was obtained from an external source system 110, the structure of the data obtained (the structure defied as the schema or the dimensions of the data), information defining the time interval associated with the loaded data, and so on. In some embodiments, the data transformation system 100 receives a request to mark a portion of a version of data for deletion or for excluding from the reporting systems. Accordingly, the meta-data store 240 stores a flag indicating the data is marked for deletion or exclusion from reports.

The storage management module 250 manages the amount of data stored in the data store 130. If the data transformation system 100 imports data at regular intervals, the amount of data stored in the data store 130 may grow significantly over time. The reporting systems 120 typically request recently loaded data. For example, data retrieved several years ago is unlikely to be requested by reporting systems 120.

In an embodiment, the storage management module 250 purges older versions of data such that for a given length of time interval, the number of versions of data stored for recent time intervals is more than the number of versions of data stored for older time intervals. For example, the storage management module 250 either deletes older versions of data or moves the older versions of data to a less expensive storage system that may be slow to access data. In some embodiments, the storage management module 250 includes aggregate information for older data in the data store 130. For example, the storage management module 250 may store sum, maximum value, minimum value, and so on for a set of data values over an interval instead of storing various versions of data over that interval. If the data transformation system 100 receives a request for an aggregate value from a reporting system, the data transformation system 100 determines the aggregate value from pre-computed aggregate values over smaller subintervals corresponding to the input interval. In an embodiment, the storage management module 250 maintains aggregate information over shorter intervals of time for more recent data, whereas the storage management module 250 maintains aggregates over longer intervals of time for older data. In other words, the storage management module 250 maintains aggregate information at a higher frequency for recent data but stores aggregate information at lower frequency for older data.

The data transformation module 220 transforms data received from external source systems 110 to a format in which the data store 130 stores the data. The data transformation module 220 also transforms data stored in data store 130 to a format suitable for an efficient transformation into reporting system 120. For example, an external source system 110 may provide information in the form of changed logs compared to a previous time point. Furthermore, the data transformation module 220 transforms the data stored in data store 130 to data in a format as requested by a reporting system 120. For example, the data store 130 may store the data in a columnar format such that data for each column is stored separately and a column represents data received at various points in time. A reporting system 120 may request data as a snapshot for a particular time point. The data transformation module 220 converts the data to a snapshot format corresponding to the data at that particular time point and sends the converted data to a reporting system 120.

In an embodiment the data transformation system 100 receives a query from the reporting system 120 and processes the query. In other embodiments, the data transformation system 100 receives a request from the reporting system 120 and generates a database query based on the request. The query for providing the requested data to the reporting system 120 is processed by the query processor module 230. The query processor module 230 may transform a query into multiple subqueries. For example, the query received by the query processor module 230 may be specified based on a particular structure or schema of the data comprising a set of dimensions. However, the structure of the data received from an external source system 110 may change over time due to addition, deletion, or modification of attributes or dimensions of data. The query processor module 230 generates subqueries to conform to the changed structure and combines the results of the subqueries so that the result returned conforms to the set of dimensions of the input query.

In some embodiments, the data transformation system 100 also acts as a reporting system that generates analytics reports. The data transformation system 100 is configured to store data for multiple external source systems 110. Each external source system 110 may be associated with a customer of the data transformation system 100. The data transformation system 100 acts as a single consolidated multi-tenant platform that stores customization parameters for each of the plurality of customers corresponding to the external source systems 110. Details of custom-branded analytic applications in a multi-tenant environment are described in U.S. patent application Ser. No. 14/051,469, filed on Oct. 11, 2013, which is hereby incorporated by reference in its entirety.

Formats of Data Processed by the Data Transformation System

Figure 3A:
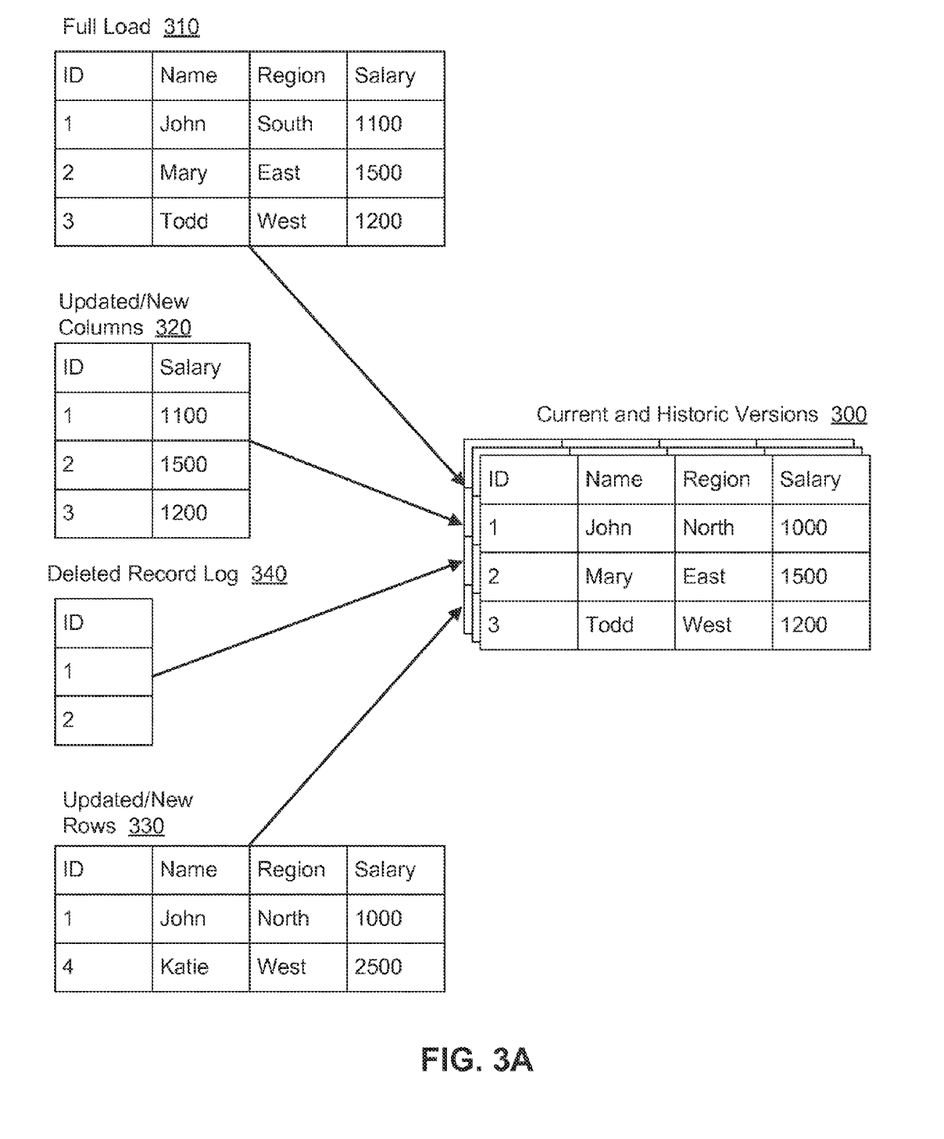
FIG. 3A illustrates examples of various formats of data received by the data transformation system from external source systems, according to an embodiment.
Figure 3B:
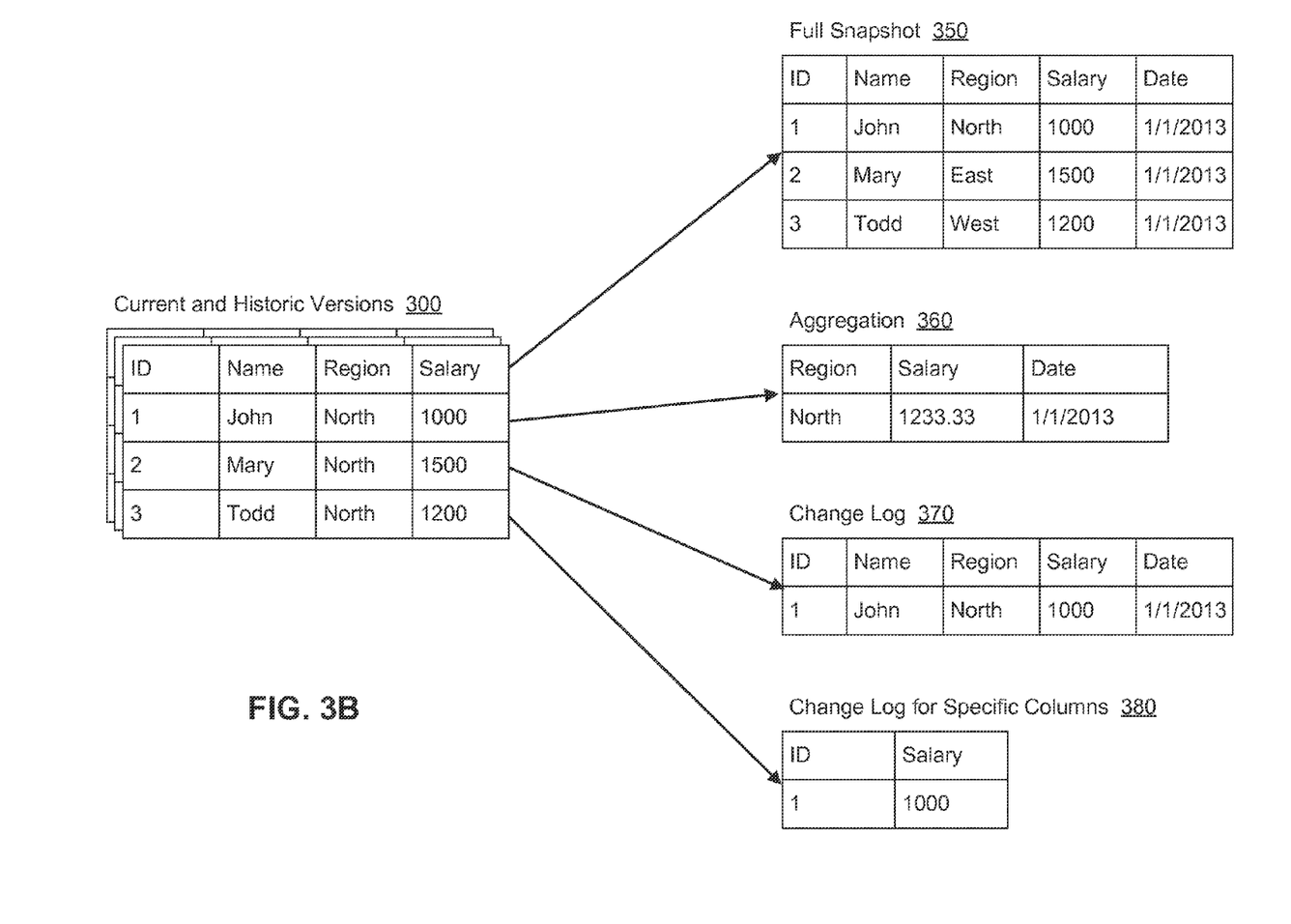
FIG. 3B illustrates examples of various formats in which the data transformation system provides data to reporting systems, according to an embodiment

FIGS. 3A and 3B illustrate how the data imported by the data transformation system 100 from an external source system 110 may be in a format different from the format in which the data is requested by a reporting system 120. The formats illustrated in FIG. 3 are examples of formats that can be supported by the data transformation system 100. However a data transformation system 100 may support other formats not shown in FIG. 3. In each type of format illustrated in FIG. 3, an ID column represents identifiers for uniquely identifying a record, for example, a record that changed, a record that was deleted, etc. The identifier ID can be a column (or columns) that form a primary key for the table.

The data transformation system 100 receives data in one of different possible formats from an external source system 110 and transforms the data to store current and historic versions 300 of data. The data transformation system 100 also receives requests from a reporting system 120 for data in a specific format and converts the data stored as current and historic versions 300 to the format requested and provides to the reporting system 120.

FIG. 3A illustrates examples of various formats of data received by the data transformation system, according to an embodiment. As shown in FIG. 3A, the data transformation system 100 may receive from an external source system 110, a full load 310 of data that represents a complete snapshot of the data available from the external source system 110. The full load 310 of data may be a subset of data available in the external source system 110 that is relevant for purposes of reporting.

The data transformation system 100 may receive from an external source system 110, updated or new columns 320. Receiving updated/new columns instead of the full load 310 of data is more efficient since a large number of columns may not have changed since a previous load was obtained by the data transformation system 100 from the external source system 110. As shown in FIG. 3A, only the "salary" column changed and the external source system 110 provided only the values of the column that changed along with a identifier for the row that changed.

The data transformation system 100 may receive from an external source system 110, logs 340 of deleted records. The deleted records log 340 may comprise a list of identifiers that identify records that are deleted. The data transformation system 100 may receive from an external source system 110, records that were deleted since the last load of data was obtained. The logs of deleted records may be provided in addition to updated/new columns 320. The data transformation system 100 may receive from an external source system 110, updated/new rows 330. For the set of updated/new rows 330, the ID column identifies rows that changed since the last load was obtained or new rows that were added since a last load of data was obtained.

The data transformation module 220 transforms the data received by the data transformation system 100 in any of the formats illustrated above to a format for storing in the data store 130. As shown in FIG. 3, the data transformation system 100 stores data as various versions (or snapshots) of data, each version corresponding to a load of data obtained from an external source system 110. The data transformation system 100 receives requests from a reporting system 120 to provide data in certain format supported by the reporting system 120. The data transformation module 220 transforms the data stored in the data store 130 to the format of the reporting system 120 and sends the information to the reporting system 120. FIG. 3B illustrates examples of various formats in which the data transformation system provides data to the reporting systems, according to an embodiment.

The data transformation module 220 may receive a request from a reporting system 120 to provide data as one or more full snapshots 350. The reporting system 120 may specify a subset of the data for the version 300 stored in the data transformation system 100. The data transformation module 220 identifies the requested information and provides the requested snapshots 350 to the reporting system 120.

The data transformation module 220 may receive a request from a reporting system 120 to provide information representing an aggregation 360 based on data from one or more versions 300. The reporting system 120 may request an aggregation 360 that comprises statistical measure based on data from one or more versions 300, for example, a summation of values, a maximum value, minimum value, mean, median, a set of values, a set of value ordered based on a particular criteria, and so on. The data transformation module 220 processes the versions 300 of data to select appropriate data based on the request and computes the requested aggregation 360. In an embodiment, the data transformation module 220 formulates a query and invokes the query processor module 230 for processing the query. In other embodiments, the request received from the reporting system 120 is in the form of a query that is processed by the query processor module 230.

The data transformation module 220 may receive a request from a reporting system 120 to provide data in the form of change logs 370. The request may specify a time interval for determining the change logs 370. The request may also specify a subset of the data set for which the change logs 370 need to be determined. The data transformation module 220 analyzes the versions 300 of data to determine the data that changed for a given time interval and generates change logs representing the information for sending to the reporting system 120. The data transformation module 220 may receive a request from a reporting system 120 to provide change logs 380 for specific columns. The data transformation module 220 identifies the requested data for the specific columns and generates change logs 380 for the specific columns for a specified interval.

Overall Process

Figure 4:
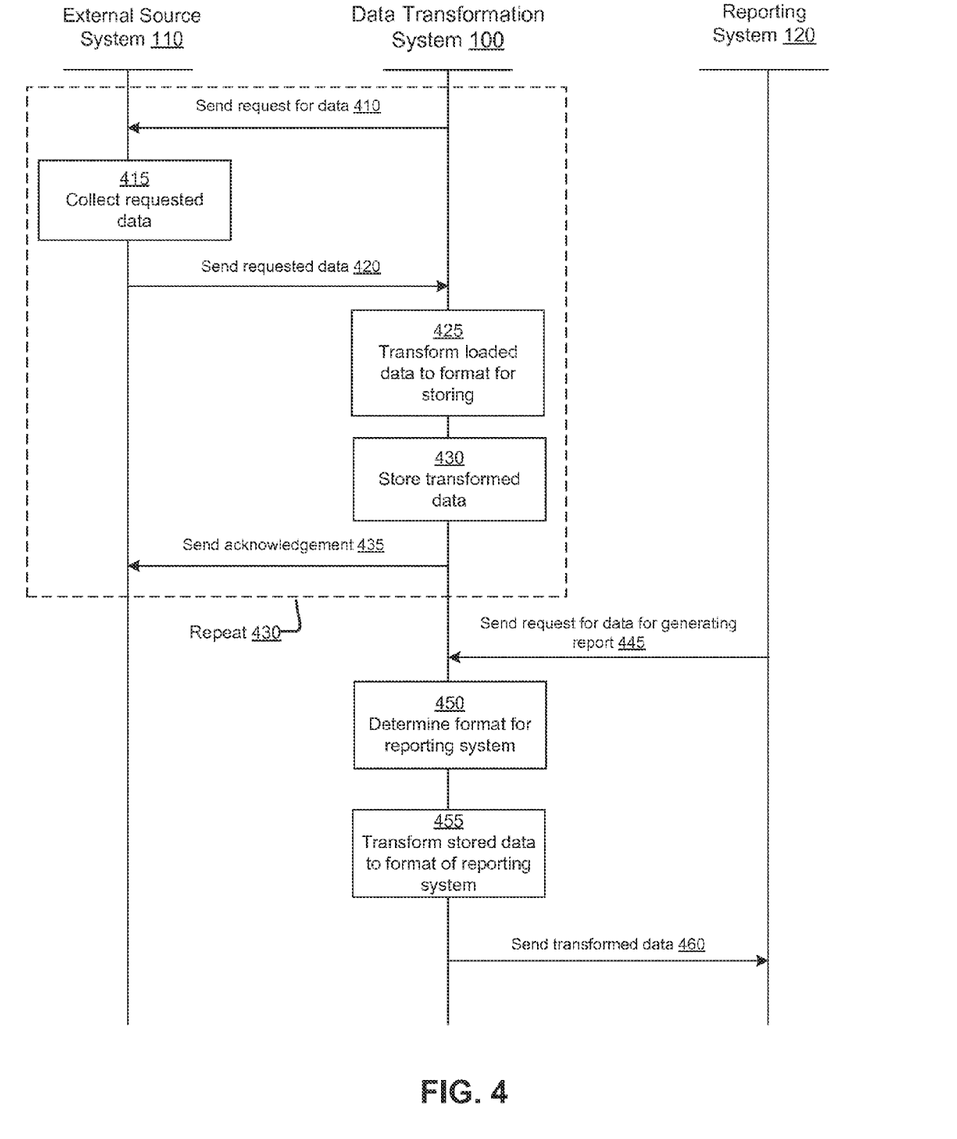
FIG. 4 shows an interaction diagram illustrating the interactions of the data transformation system with external source systems and reporting systems, according to an embodiment.

FIG. 4 shows an interaction diagram illustrating the interactions of the data transformation system 100 with external source systems 110 and reporting systems 120, according to an embodiment. The steps shown in FIG. 4 may be performed in an order different from those shown in FIG. 4. Furthermore, the actions described herein may be performed by modules different from those indicated herein.

The data transformation system 100 sends 410 a request for data to an external source system 110. The request for data may be based on a user-defined schedule. For example, the data transformation system 100 may receive information describing user-defined intervals at which the data transformation system 100 requests and receives data from each external source system 110. The data transformation system 100 sends 410 the request for data at the end of an interval to the corresponding external source system 110.

The external source system 110 collects 415 the data requested by the data transformation system 100. In some embodiments, the external source system 110 executes a software for performing various operations related to the business of the external source system 110. The software running on the external source system 110 supports certain application programming interfaces (APIs) that allow data to be retrieved from the external source system 110. The external source system 110 sends 420 the requested data to the data transformation system 100.

The import module 210 of the data transformation system 100 receives the data from the external source system 110 and stores the data in the data store 130. In an embodiment, the import module interacts with an external system via a network to receive data from the system. The external system typically provides metadata describing the data being transmitted. The import module 210 receives the data and processes it in accordance with the metadata received from the system. The format in which the data transformation system 100 receives data from the external source system 110 may be different from the format in which the data transformation system 100 stores the data in the data store 130. For example, the data store 130 may store the data in a columnar format whereas the external source system 110 provides the data in a format different from columnar format. The data transformation module 220 transforms 425 the received data from the format in which the data is provided by the external source system 110 to a format in which the data is stored in the data transformation system 100. The data transformation module 220 stores 430 the transformed data in the data store 130.

The data transformation system 100 sends 435 an acknowledgement to the external source system 110 indicating that the data transformation system 100 successfully received the data from the external source system 110. The above steps 410, 415, 420, 425, 430, and 435 corresponding to the data transformation system 100 sending 410 request for data, receiving 420 the data from the external source system 110, transforming 425 the data, storing 430 the data, and sending 435 the acknowledgement may be repeated 430, for example, based on a user defined schedule.

The reporting system 120 sends 445 request for data to the data transformation system 100. The reporting system 120 may send 445 the request in response to a request from a user of the reporting system 120 requesting a particular report. Alternatively, the reporting system 120 may generate a report based on a user defined schedule. For example, the reporting system 120 may provide a monthly report to certain subscribers.

The data transformation system 100 determines 450 the format in which the data transformation system 100 is expected to provide data to the reporting system 120. The format in which data transformation system 100 should provide data to the reporting system 120 may be received by the data transformation system 100 via a client device 140. For example, a system administrator may provide a description of the format for a reporting system 120. The data transformation module 220 transforms 455 the data stored in the data store 130 to the format of the reporting system 120. The data transformation system 100 sends 460 the transformed data to the reporting system 120.

Processing Changes in Structure of Loaded Data

If the structure of the data received from an external source system 110 changes over a time interval, the data transformation system 100 processes any requests for data received from a reporting system 120 to generate appropriate subqueries to conform to the differences in structures of the data received from the external source system 110. The changes in structure of the data may correspond to changes in dimensions of the data, for example, new dimensions added, dimensions deleted or modified. The data transformation system 100 processes the data such that the data provided to the reporting system conforms to a particular structure based on the request of the reporting system 120, combines the transformed data, and provides the combined data to the reporting system 120.

In some embodiments, the request to provide data to a reporting system comprises a query based on a set of dimensions. Accordingly, the reporting system 120 requests data from the data transformation system 100 assuming that the data for an external source system 110 stored in the data transformation system 100 comprises a particular set of dimensions. However, since the data transformation system 100 obtains data from the external source system 110 periodically, the structure of data may change over time. As a result, previous versions of data may not include all the dimensions from the requested set of dimensions.

The set of dimensions of the versions of data loaded from the external source system 110 may change, for example, if a new dimension (or attribute) is added to a set of data, a dimension is removed from the data or a dimension is modified from the data. For example, an external source system 110 may introduce a new line of products that requires a new set of attributes/dimensions to represent. Alternatively, the external source system 110 may stop making a line or products and stop using one or more attributes/dimensions. Similarly, changes in the products may cause an attribute to be changed from one representation to another. These attributes may be added, deleted, or modified based on the type of reporting requests that are received for the external source system 110. For example, if the executives of the business reviewing the reports request a particular type of report that is not currently supported by the data, the structure of the data may be modified to support the new report.

Accordingly, different versions (or snapshots) of data for an external source system 110 stored by the data transformation system 100 may store data corresponding to different sets of dimensions. However, the request for providing data to reporting systems 120 typically assumes a target set of dimensions, for example, the set of dimensions corresponding to the latest version of data or a set of dimensions corresponding to any specific version of data. The data transformation system 100 processes the request for data so as to provide the data in the target set of dimensions even though the different versions of data processed do not represent the target set of dimensions.

In an embodiment, the query processor module 230 identifies one or more versions of stored data in which the set of dimensions is different from the target set of dimensions. The query processor module 230 generates one or more subqueries to process the data from the identified versions of data. For example, assume that a version of data is missing a dimension of the target set of dimension. The query processor module 230 generates a subquery for retrieving data from the version of data with missing dimension. The query processor module 230 generates another subquery for retrieving data from the remaining versions that comprise the requested data. The query processor module 230 executes the first and second subqueries and combines the results for providing to the reporting systems.

In an embodiment, the subquery for retrieving data from the version of data with missing dimensions uses default values for the missing dimension. These default values may be preconfigured for each dimension. An example default value is a null value. However, the default values used for missing dimensions may depend on the type of query for processing the data. For example, if the query determines an aggregate value based on data from a plurality of versions of data, the query processor module 230 uses a default value based on the type of aggregation being determined. If the aggregation determines a maximum of a set of values, the query processor module 230 uses the smallest possible value for the dimension as the default for missing dimensions. If the aggregation determines a minimum of a set of values, the query processor module 230 uses the largest possible value for the dimension as the default for missing dimensions. If the aggregation determines a sum of a set of values, the query processor module 230 uses zero as the default for missing dimensions. If the aggregation determines a product of a set of values, the query processor module 230 uses 1 as the default for missing dimensions.

If the versions of data being processed include a version in which a dimension is represented in a different format compared to the target set of dimensions, the query processor module 230 adds a transform function for processing this dimension. The transform function modifies the values of this particular dimension to a corresponding dimension from the target set of dimension. For example, a date value for a dimension in the identified version of data may be represented in a format different from the corresponding dimension in the target set. The query processor module 230 introduces a transformation function for transforming data from that dimension and converting the format of the date values to the requested format.

Similarly, the dimensions of the data in various versions of data may be modified such that two or more dimensions from a version of data are combined to obtain a new dimension. Alternatively, a single dimension in a newer version of data may correspond to two or more distinct dimensions of an older version of data. The meta-data store 240 stores data transformation functions that allow values to be converted from one set of dimensions to another set of dimensions. For example, if a plurality of dimensions of older versions of data are combined to a single dimension in newer versions of data, the meta-data store 240 stores a transformation function that combines individual values from the plurality of dimensions to obtain a corresponding value of the single dimension. Similarly if a single dimension from older versions of data is split into a plurality of dimensions in newer versions of data, the meta-data store 240 stores transformation functions to obtain values of dimensions from the plurality of dimensions from the single dimension.

The query processor module 230 introduces these transformation functions in the subqueries generated to transform the data values to one particular set of dimensions. For example, if a request to compute a report based on versions of data including the older versions and newer versions is received, the query processor module 230 generates subqueries for the older versions and newer versions and introduces the transformation functions in the older versions (or any appropriate version) to generate data conforming to the set of dimensions requested by the reporting system 120.

Processing Corrupted Data Loads

In an embodiment, the data transformation system 100 may receive corrupted data from an external source system 110 for a particular interval. Alternatively, the data may represent information that needs to be removed from the data store 130 for any reason, for example, the data may include sensitive information, or a developer may want to remove some data for purposes for testing. The data transformation system 100 stores metadata information in meta-data store 240 describing the time at which each load of data was received by the import module 210.

The data transformation system 100 receives information identifying a particular load that includes corrupted data or data that needs to be excluded. For example, the data transformation system 100 may receive from a system administrator via the client device 140, the time at which the corrupted data was loaded. The data transformation system 100 stores information describing the fact that the data loaded for that particular time was corrupted. Accordingly, if the data transformation system 100 receives a request from a reporting system 120 for data including the corrupted data, the data transformation system 100 processes the request so as to exclude the corrupted data.

In an embodiment, the data transformation system 100 receives a request from a reporting system 120 to provide an aggregate value over a time interval that includes various versions of data including a version with corrupted data. The data transformation system 100 determines the aggregate values without including the corrupted data. In one embodiment, the query processor module 230 identifies all versions including data that needs to be processed in response to a request for data from a reporting system 120. The query processor module 230 removes any snapshots based on data that is determined to be corrupted. The query processor module 230 determines the aggregate value based on the remaining snapshots and provides the information to the requesting reporting system 120.

In an embodiment, the data transformation system 100 receives information describing corruption in a portion of data that is loaded by the import module 210 from an external source system 110. The data transformation system 100 stores in the meta-data store 240, information describing the portion of the data that is corrupted. For example, the meta-data store 240 may store information identifying a particular dimension that has corrupted data. The meta-data store 240 may store information identifying a table of data as storing the corrupted data. The meta-data store 240 may store information identifying a subset of data, for example, data within a range of identifiers or a list of identifiers as being corrupted. For example, the meta-data store 240 may indicate that data related to a particular set of geographical regions is corrupted or that data related to a range or set for product identifiers is corrupted, or the data related to transactions within a particular time interval is corrupted. The query processor module 230 generates and stores query filters identifying the corrupted data. In an embodiment, the query filter may be a condition that selects the portion of data that corresponds to the corrupted data (or a query filter that excludes the corrupted data).

The query processor module 230 filters the data used for processing a request from a reporting system 120 by applying filters to the appropriate data sets to eliminate the corrupted data. For example, if the request from a reporting system 120 requests data describing a particular dimension, the query processor module 230 modifies a query used for selecting the requested data by applying a filter that excludes data describing the dimension that corresponds to corrupted data. The query processor module 230 executes the modified query and returns the requested result without using the corrupted data.

In some embodiments, the data transformation system 100 invalidates the data identified as corrupted data. In these embodiments, the data may not be retrieved once it is invalidated. Old data that has been invalidated may eventually be deleted. However, in some embodiments, the data transformation system 100 stores invalidated data for at least a threshold amount of time for purposes of auditing and also to allow the possibility of restoring data that was invalidated erroneously. The query processor module 230 does not have to modify incoming queries for excluding the deleted data since the data is removed from the data store 130. In other embodiments, the data to be removed may be moved to another store as a backup. The other store is not queried during the processing of queries from query processor module 230 but may be queried under special circumstances, for example, if a system administrator wanted to inspect that particular load of data. Although the above description uses an example of the data transformation system excluding corrupted data, the above process can be used for excluding any type of data for any reason.

Enhancing Loaded Data

The data transformation system 100 may receive information for modifying or enhancing a load of data that the import module 210 loaded at a particular time. For example, the data transformation system 100 may receive at a later date, data that was missing in a past load obtained by import module 210 from an external source system 110. The missing data may represent a set of transactions that were not available when the data was loaded. The data may not have been available when it was loaded due to malfunction of some hardware component for example, a server or network. The data transformation module 220 receives at a later date, data that either enhances, modifies, or replaces at least a portion of data that was received during a past load.

The data transformation module 220 stores the new data in the data store 130 along with metadata describing the new data in the meta-data store 240. In an embodiment, the data transformation module 220 processes the data stored in the data store 130 to enhance it based on the new information. For example, if the new data represents additional information for a particular load, the data transformation module 220 updates a snapshot representing that load by enhancing the snapshot with the additional information. If the data is assimilated in the appropriate snapshot, the query processor module 230 can execute any query against the snapshot to retrieve the enhanced data.

In alternate embodiments, the data transformation module 220 stores the additional information separate from the snapshot representing the data received and stores metadata describing the additional data in the meta-data store 240. In this embodiment, the query processor module 230 modifies the queries processed against the snapshot representing the load of data to execute additional subqueries against the enhanced data and combines the results.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for transforming data obtained from external source systems for providing to reporting systems, at least a portion of the method being performed by a computing device comprising at least one processor, the method comprising: maintaining a plurality of versions of data obtained from one or more external source systems, each version of data associated with a time interval during which the data was processed by the external source system, the maintaining comprising, for each of the plurality of versions of data: loading data from an external source system, storing the loaded data as a version of data, and storing metadata describing the version of the data, the metadata describing at least the time of loading the data; receiving a request to provide data obtained from an external source system to a reporting system; identifying a set of versions of data storing the requested data; obtaining the requested data from the identified set of versions of data;

transforming the requested data to a format of the reporting system; and sending the requested data to the reporting system.

2. The method of claim 1, wherein the external source system provides the data in a source format and the versions of data are stored in columnar format, the method further comprising:
converting loaded data from the source format to the columnar format.

3. The method of claim 1, wherein the external source system provides the data as change logs, the method further comprising:
applying the change logs to a previous version of data to obtain a new version of data.

4. The method of claim 1, further comprising:
receiving a target format for sending requested information to a reporting system to be change logs; and
determining change logs by comparing at least two versions of data.

5. The method of claim 1, further comprising:
receiving a target format for sending requested information to a reporting system to be an aggregation of information across two or more versions of data;
retrieving data from the two or more versions of data; and
determining requested aggregation of data over the two or more versions of data.

6. The method of claim 1, wherein managing the plurality of versions of data further comprises:
purging older versions of data such that for a given size of time interval, the number of versions of data stored for recent time intervals is more than the number of versions of data stored for older time intervals.

7. The method of claim 1, wherein the data loaded from the external source system comprises one or more of: row based changes, column based changes, a full snapshot, or information identifying deleted rows, and the data provided to the reporting system comprises one or more of a full snapshot, aggregation of data, change logs, or change logs for a particular column, the method comprising:
transforming the data loaded from the external source system to the format of the reporting system.

8. The method of claim 1, further comprising:
receiving a request to exclude data previously loaded from the external source system, the request identifying the data to be excluded;
identifying a version of data stored comprising the data to be excluded; and
excluding the identified data from data provided to reporting systems.

9. The method of claim 1, further comprising:
receiving a request to modify data previously loaded from the external source system, the request identifying the data to be modified;
identifying a version of data stored comprising the data to be modified;
modifying the identified data in conformance with the request to modify; and
providing the modified data to reporting systems.

10. The method of claim 1, wherein the request to provide data to a reporting system comprises a query based on a target set of dimensions, the method further comprising:
identifying at least a version of data from the set of versions storing the requested data, wherein the identified version has a set of dimensions different from the target set of dimensions; and
generating a subquery to process the data from the identified version of data.

11. The method of claim 10, wherein generating the subquery comprises:
generating a first subquery for retrieving data from the version of data with set of dimensions different from the target set of dimensions;
generating at least a second subquery for retrieving data from the remaining versions from the set of versions of data; and
executing the first and second subqueries and combining the results for providing to the reporting systems.

12. The method of claim 11, wherein the identified version of data has a set of dimensions that is missing at least a dimension from the target set of dimension.

13. The method of claim 12, wherein the first subquery for retrieving data from the one or more versions of data with missing dimensions uses default values for the one or more missing dimensions.

14. The method of claim 12, further comprising:
determining the default values based on a type of aggregation of data to be computed for a reporting system.

15. The method of claim 12, wherein the identified version of data has a set of dimensions that includes a dimension in a format different from a corresponding dimension in the target set of dimension.

16. The method of claim 15, wherein the first subquery for retrieving data from the identified version of data includes a transformation function for transforming values of the different dimension to values of the corresponding dimension in the target set of dimension.

17. The method of claim 10, wherein the identified version of data has a set of dimensions that includes a first dimension and a second dimension that map to a single dimension in the target set of dimensions.

18. The method of claim 17, wherein the first subquery for retrieving data from the identified version of data includes a transformation function for generating values of the single dimension based on the first and second set of dimensions.

19. A computer program product comprising a non-transitory computer-readable storage medium containing instructions for execution on a computing device, the instructions for: maintaining a plurality of versions of data obtained from one or more external source systems, each version of data associated with a time interval during which the data was processed, the maintaining comprising, for each of the plurality of versions of data: loading data from an external source system, storing the loaded data as a version of data, and storing metadata describing the version of the data, the metadata describing at least the time of loading the data;
receiving a request to provide data obtained from an external source system to a reporting system; identifying a set of versions of data storing the requested data;
obtaining the requested data from the identified set of versions of data; transforming the requested data to a format of the reporting system; and sending the requested data to the reporting system.

20. The computer program product of claim 19, wherein the data loaded from the external source system comprises one or more of: row based changes, column based changes, a full snapshot, or information identifying deleted rows, and the data provided to the reporting system comprises one or more of a full snapshot, aggregation of data, change logs, or change logs for a particular column, the non-transitory computer-readable medium containing further instructions for:
transforming the data loaded from the external source system to the format of the reporting system.

* * * * *